(12) United States Patent
Russell

(10) Patent No.: US 7,099,444 B1
(45) Date of Patent: Aug. 29, 2006

(54) DATABASE SERVICE FOR TELEMARKETERS TO SCREEN AND BLOCK SELECTED TELECOMMUNICATION MESSAGES

(75) Inventor: Larry A. Russell, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 169 days.

(21) Appl. No.: 10/826,191

(22) Filed: Apr. 15, 2004

Related U.S. Application Data

(60) Provisional application No. 60/463,706, filed on Apr. 16, 2003.

(51) Int. Cl.
*H04M 1/56* (2006.01)

(52) U.S. Cl. .......................... 379/142.02; 379/210.02; 379/196

(58) Field of Classification Search ...................... None
See application file for complete search history.

(56) References Cited

U.S. PATENT DOCUMENTS

| | | | |
|---|---|---|---|
| 4,756,020 A | 7/1988 | Fodale | |
| 5,293,253 A | 3/1994 | Kida et al. | |
| 5,898,770 A | 4/1999 | Valentine | |
| 6,239,881 B1 | 5/2001 | Shaffer et al. | |
| 6,259,779 B1 | 7/2001 | Council et al. | |
| 6,411,708 B1 | 6/2002 | Khan | |
| 6,453,032 B1 | 9/2002 | Lennert et al. | |
| 6,567,504 B1 | 5/2003 | Kercheval et al. | |
| 6,944,276 B1 * | 9/2005 | Nguyen et al. | 379/142.02 |
| 2002/0067820 A1 | 6/2002 | Benson et al. | |
| 2002/0191776 A1 | 12/2002 | Khan | |

OTHER PUBLICATIONS

U.S. Appl. No. 10/683,670, Doorman et al.

\* cited by examiner

*Primary Examiner*—Creighton Smith

(57) ABSTRACT

A method and apparatus for screening and blocking certain telecommunications sent via a communication network by telemarketers or other message senders is disclosed. This service is provided to subscribing parties that initiate the telecommunications. A periodically updated "do-not-contact" database is incorporated in cooperation with network nodes to block screened messages from being delivered to an intended destination that is listed in the database. Screening and blocking can be accomplished on the customer premises or at a network node shared with non-subscribing parties. The network node ignores messages sent from non-subscribing parties. Various marking or screening techniques can be used to identify those telecommunication messages sent from or on behalf of subscribing message senders. Blocking is accomplished by various techniques including audio disconnect instructions routed back to a human agent, or actuating coded signals to automatically cancel delivery in accordance with the updated database.

26 Claims, 5 Drawing Sheets

DATABASE SERVICE FOR TELEMARKETERS TO SCREEN AND BLOCK SELECTED TELECOMMUNICATION MESSAGES

This application claims the benefit of U.S. Provisional Application No. 60/463,706 filed on Apr. 16, 2003, which is incorporated herein by reference.

BACKGROUND OF THE INVENTION

This invention relates generally to monitoring destination addresses of telecommunications, and more specifically to making an updated list of "Do Not Contact" destinations available to telemarketers.

Recent announcements indicate that the Federal Trade Commission and Congress have mandated the creation of a national "Do Not Call" list (DNC List) for telemarketers. Procedures are established for allowing telephone customers to add selected telephone numbers to the DNC List. With some exceptions, if a telemarketer calls a number on the DNC List, they can be subject to considerable fines or penalties. Individuals can put their numbers on the list through a web or phone interface, and telemarketers may have to incur extra expenses in order to download periodically updated versions of the DNC List and incorporate such a list into their marketing operations.

Telemarketers will have to make special arrangements to have their automatic calling systems modified to check the DNC List before a call is placed. Telemarketers who dial numbers manually will incur labor costs associated with having their callers consult the DNC List manually, or they will have to buy pre-screened calling lists from calling list suppliers. Since they are required to use currently updated do-not-call list information, they will have to pay to maintain accurate approved call lists, and it seems likely the telemarketers may still be liable for fines or penalties if the call list is not properly screened by the supplier.

The underlying basis for a legally mandated DNC List is also applicable to pre-selected groupings of address destinations for market targeting purposes, where the groupings are chosen based on geography, age or any other demographic categories.

The need for implementing such a screening technique is not limited to voice telemarketing messages sent to telephone customers. Other telecommunication networks for text, data, audio, video, images, and the like would benefit from a data management system that manages and implements various types of "Do-Not-Contact" listings. Moreover the message transmission media for such a screening technique includes wireless, cable, Internet, satellite, power lines, LAN, WAN, PSTN, fax, etc.

BRIEF SUMMARY OF THE INVENTION

In order to resolve the aforementioned problems, the invention provides a method for enabling multiple telemarketing entities to subscribe to a database service for preventing completion of telecommunication messages sent via a communications network to selected "do-not-contact" destinations. A call processing system either enables or alternatively blocks calls to a dialed number based on whether or not that number is included in a database list of numbers.

As one aspect of the invention, an administrative system downloads numbers into a call processing system for purposes of blocking calls to those numbers.

Various embodiments are provided for screening and blocking certain telecommunications sent via a communication network by telemarketers or other message senders. For example an embodiment may include creating a directory of subscribing telemarketing entities. Telecommunication messages are initially screened to identify all origin addresses or billing addresses for the subscribing entities. Such pre-screened messages are then processed in order to compare a message destination address with the "do-not-contact" database. Remedial action is taken to disable, disconnect or otherwise prevent delivery of any pre-screened message to a "do-not-contact" destination listed in the database.

In some embodiments the message processing and remedial action can occur at the customer premises of a subscribing entity. In other embodiments the message processing and remedial action can occur at a local exchange office, network node or a switch located remotely from the customer premises. Similarly the "do-not-contact" databases may be located at a subscriber's premises, or at a local exchange office, network node or switch.

The screening and block features provide valuable benefits to subscribing parties that initiate telecommunications such as unsolicited sales, promotional, survey or informational messages. One aspect of the invention incorporates a periodically updated "undesirable destination" or "do-not-contact" database in cooperation with network components to block screened messages from a subscribing party from being delivered to an intended destination that is listed in the database. Screening and blocking can be accomplished by dedicated network components used exclusively by an individual subscribing entity, or by shared network nodes or switches handling transmissions from multiple sending parties including both subscribing parties and non-subscribing parties. The screening and blocking portion of such a shared network node ignores messages sent from non-subscribing parties, thereby allowing all such messages to proceed uninterrupted to their addressed destinations. Messages that are pre-screened and identified as coming from a subscribing party will be allowed to pass to their addressed destinations unless the addressed destination is found on a DNC List.

Various marking or screening techniques can be used to identify those telecommunication messages sent from or on behalf of subscribing message senders. Blocking can be accomplished by various techniques including automatically sending audio disconnect instructions routed back to a human agent, or automatically actuating coded signals to automatically block delivery in accordance with the updated DNC List database.

An aspect of the invention is to provide a unique proprietary technique for implementing recent changes in the law that have created obligations for certain classes of telemarketers to prevent delivery of unsolicited telecommunication messages to unauthorized addressees. Publicly available lists are changed from time to time in accordance with the provisions of the law. Implementing such changes into a system and service that efficiently helps telemarketers and others comply with their legal obligations is an aspect of the invention.

Where necessary, one aspect of the invention provides an override exception when justified by a pre-determined exemption so that message senders can deactivate any blocking of transmission or message cancellation that might otherwise occur. For example under the recent telemarketing law, unsolicited messages are allowed to be sent to existing customers, and certain entities such as charities or government agencies are deemed exempt from provisions that apply to other parties.

These and other advantages of the invention will be apparent to those of ordinary skill in the art by reference to the following detailed description and the accompanying drawings.

DETAILED DESCRIPTION

Generally speaking, the invention contemplates making a unique service available to telemarketers or other message senders for real-time screening and blocking delivery of telecommunication messages to unwanted or unauthorized destinations.

In some embodiments of the invention a periodically updated database (DB) of "do-not-contact" destinations is linked to a communication node that handles messages transmitted from a subscribing party, as well as in some instances messages from non-subscribing parties. All messages that are identified as coming from a subscribing party are pre-screened to detect a destination, and are then further processed to determine whether an intended destination for the pre-screened message is listed on the "do-not-contact" database. If the intended destination matches a "do-not-contact" database destination, then remedial action is taken to prevent delivery of the message.

As used herein, the phrase "do-not-contact" as applied to destinations refers to voice, text, alphanumeric, fax, data, image, audio, and video messages transmitted over various communication networks included but not limited to wireless, cable, Internet, satellite, radio, television, power lines, LAN, WAN, and PSTN. For purposes of discussing exemplary embodiments of the invention implemented in telephony networks, the more description phrase "do-not-call" is used for purposes of clarification.

Figure 1:
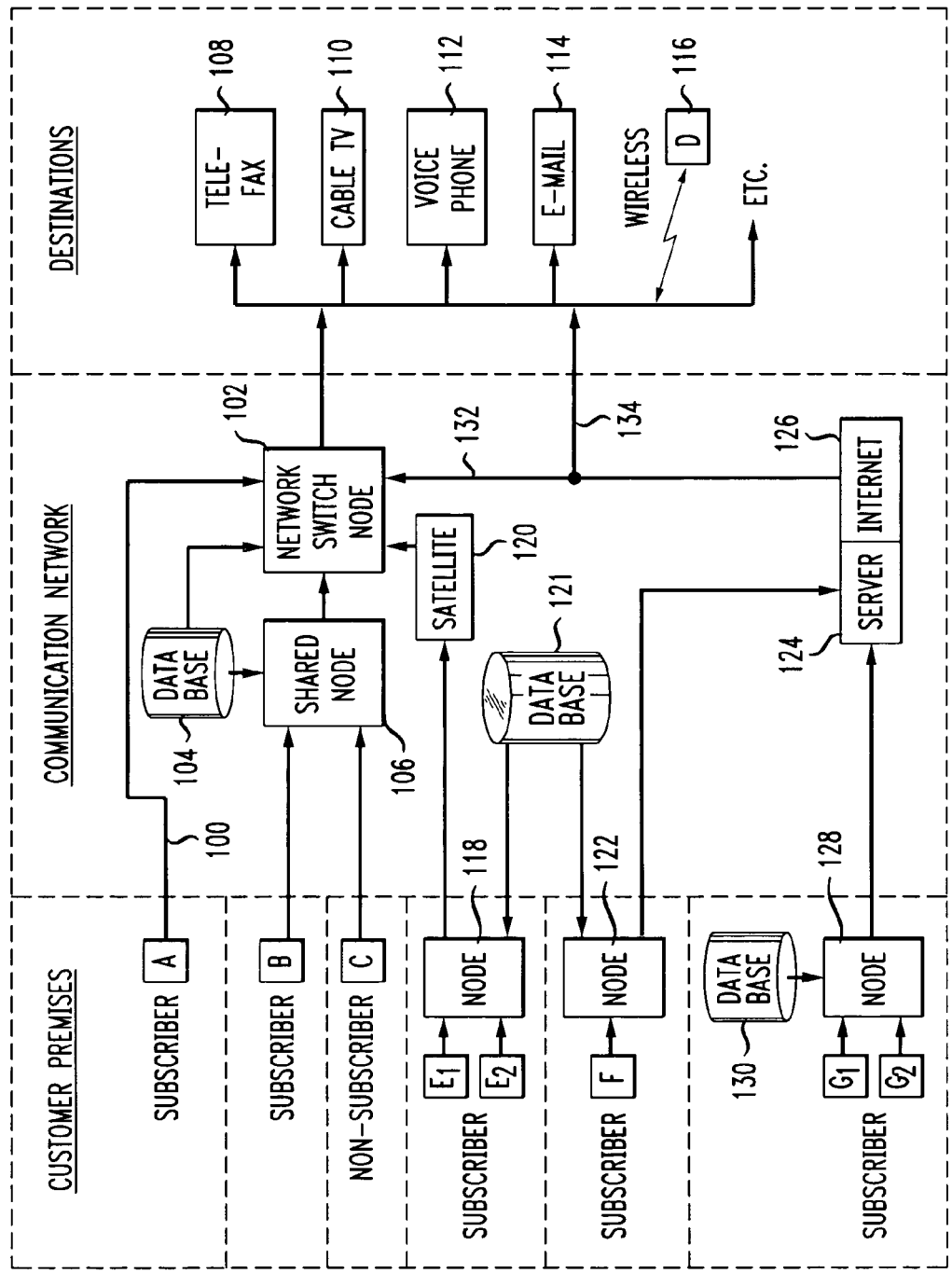
FIG. 1 is a schematic drawing showing various embodiments of the invention implemented on customer premises and/or in a communication network.

Referring to FIG. 1, various different combinations of components are shown to implement features of the invention in an exemplary communications network. The list of undesirable destinations is referred to as a DNC List for purposes of illustration. For example, service subscriber A may send messages through a dedicated line 100 to network switch node 102, and a comparison of subscriber message destinations with the updated DNC List on shared database 104 may be made by network switch node 102 remotely located from customer premises. Such messages from subscriber A could be pre-identified with coded markings or pre-identified based on arrival on a dedicated line, and therefore qualify for the screening and blocking service of the invention.

In another example, service subscriber B and non-subscriber C may send messages through a shared node such as central office node 106 for transmission to network switch node 102, and selective processing of all such messages may be made by shared node 106 remotely located from customer premises. At shared node 106 any messages identified as coming from service subscriber B are pre-screened to identify their intended destination, and are further processed at shared node 106 to make a comparison of pre-screened message destinations with the updated DNC List on shared database 104. Of course, it is to be understood that such selective processing, pre-screening and/or comparison functions for messages from subscriber B and non-subscriber C could alternatively be performed by network switch node 102.

Messages from service subscribers A and B that have destinations listed on the updated DNC List are blocked to prevent completion of delivery. All other messages from service subscribers A and B are forwarded for completion of delivery through network switch node 102. All messages from non-subscriber C are forwarded without interruption for completion of delivery through shared node 106 and network switch node 102.

As shown in FIG. 1, these do-not-contact subscription services for screening and blocking selected messages sent by subscribing entities can be implemented in communication networks that deliver sales, promotional, survey or informational messages to diverse types of receiving destinations such as facsimile machines 108, television/cable receivers 110, voice phones 112, e-mail addresses 114, and wireless destinations (D) such as wireless units 116.

As further shown in FIG. 1, additional exemplary combinations of components for implementing features of the invention are illustrated. For example, multiple related subscriber entities E1 and E2 send messages through dedicated special processing node 118 for transmission via satellite 120 to network switch node 102, and selective processing of all such messages may be made by dedicated node 118 located on customer premises including a comparison of message destinations with the updated DNC List on shared database 121. Shared database 121 is located away from customer premises as shown. Subscriber entity F sends messages through dedicated special processing node 122 to server 124 for transmission via Internet 126, and selective processing of all such messages may be made by dedicated node 122 located on customer premises including a comparison of message destinations with the updated DNC List on shared database 121.

It is to be understood that dedicated node 118 receiving messages from multiple related subscribing entities such as E1 and E2 could differentiate between the two originators and make appropriate separate destination comparisons with different do-not-call lists respectively applicable to the type of marketing, promotional, survey or informational message being sent. Similar message/category differentiation based on demographic characteristics of targeted destinations could be made at a shared node that processes messages from multiple subscribers as well from non-subscribers.

Of course, it is to be further understood that such selective processing, pre-screening and/or comparison functions for messages from subscribers E1, E2, and F could alternatively be performed by network switch node 102.

FIG. 1 shows another exemplary combination of components for subscriber entities G1 and G2 sending messages through dedicated special processing node 128 to server 124 for transmission via Internet 126, and selective processing of all such messages may be accomplished by dedicated node 128 located on customer premises including comparison of message destinations with the DNC List on dedicated database 130. Dedicated database 130 may be located on customer premises as shown. Such messages may be directed along path 132 to network switch node 102 (which alternatively could provide the screening and blocking functions) or proceed along a different network path such as 134 toward a destination address.

Figure 2:
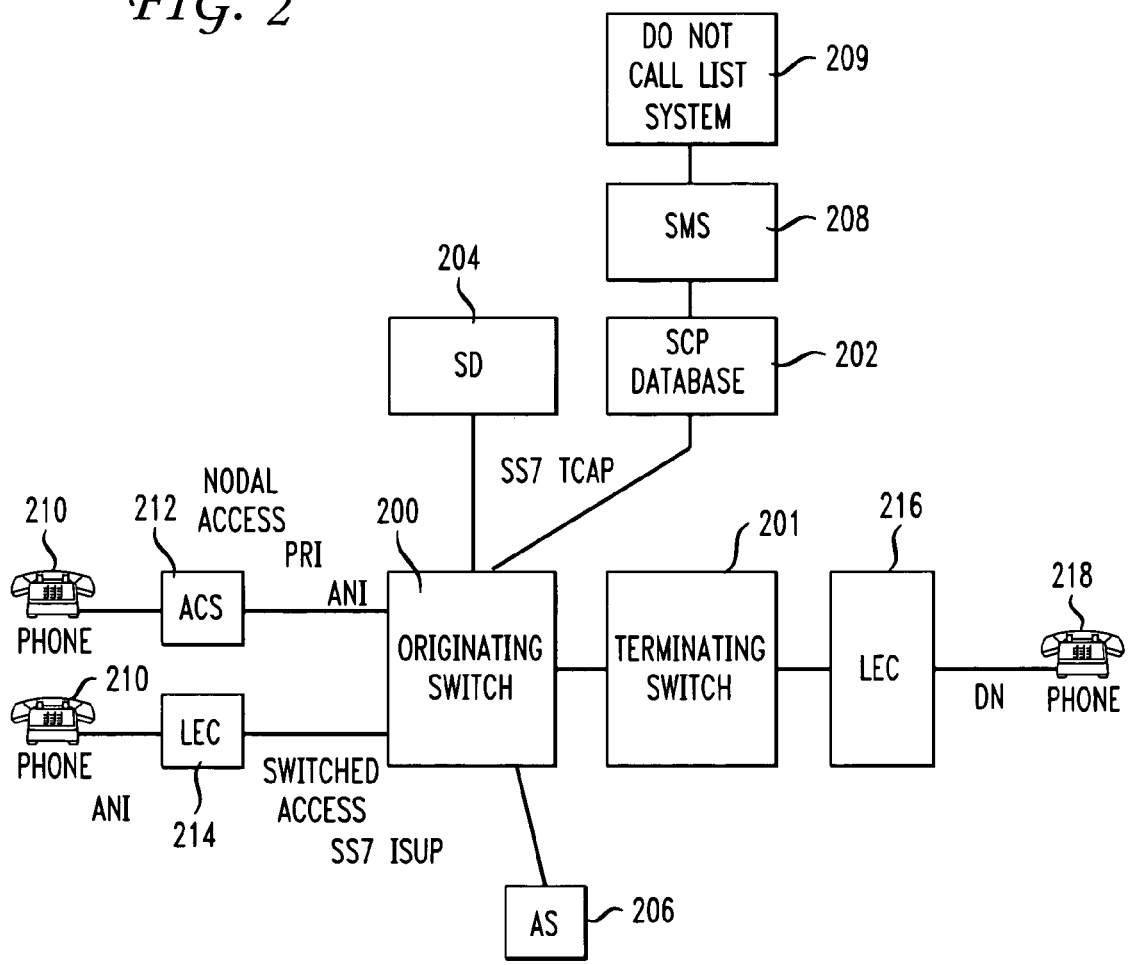
FIG. 2 is a schematic drawing showing an embodiment of the invention implemented in a telephone switching system.

In another embodiment of the invention implemented in a telephony network as shown in FIG. 2, the screening and blocking service can be implemented with the following components: a switching system (such as a 4ESS or 5ESS digital central office switches of Lucent, or DMS250 digital central office switches of Nortel) having an originating switch 200 and a terminating switch 201; a Service Control Point (SCP) Database 202 (such as a 2NCP call control database of AT&T) which stores the list of Do Not Call Dialed Numbers (DNCs); a subscriber database such as the Segmentation Directory (SD) 204 or a switch resident database which stores the Automatic Number Identifications (ANIs) of the customers that have subscribed to this service; an Announcement System (AS) 206 such as an Intelligent Peripheral (IPe) that can play announcements and tones to a caller; and a Service Management System (SMS) 208 which can download the National Do Not Call list of Dialed Numbers (DNs) from an accessible DNC System 209 into the SCP Database 202. The SS7 TCAP protocol may be used for transfer of non-circuit related information between signaling points. Calls may be initiated from calling phones 210 through an automatic calling system (ACS) 212 or by human agents intended for ultimate delivery such as through LEC 216 to a dialed number (DN) at a destination phone 218. Various phone connections are possible for implementing the features of the invention, including the illustrated connection through local exchange carrier (LEC) 214 for switched access, and the illustrated direct nodal access (i.e., dedicated access) connection that bypasses the LEC.

Figure 3:
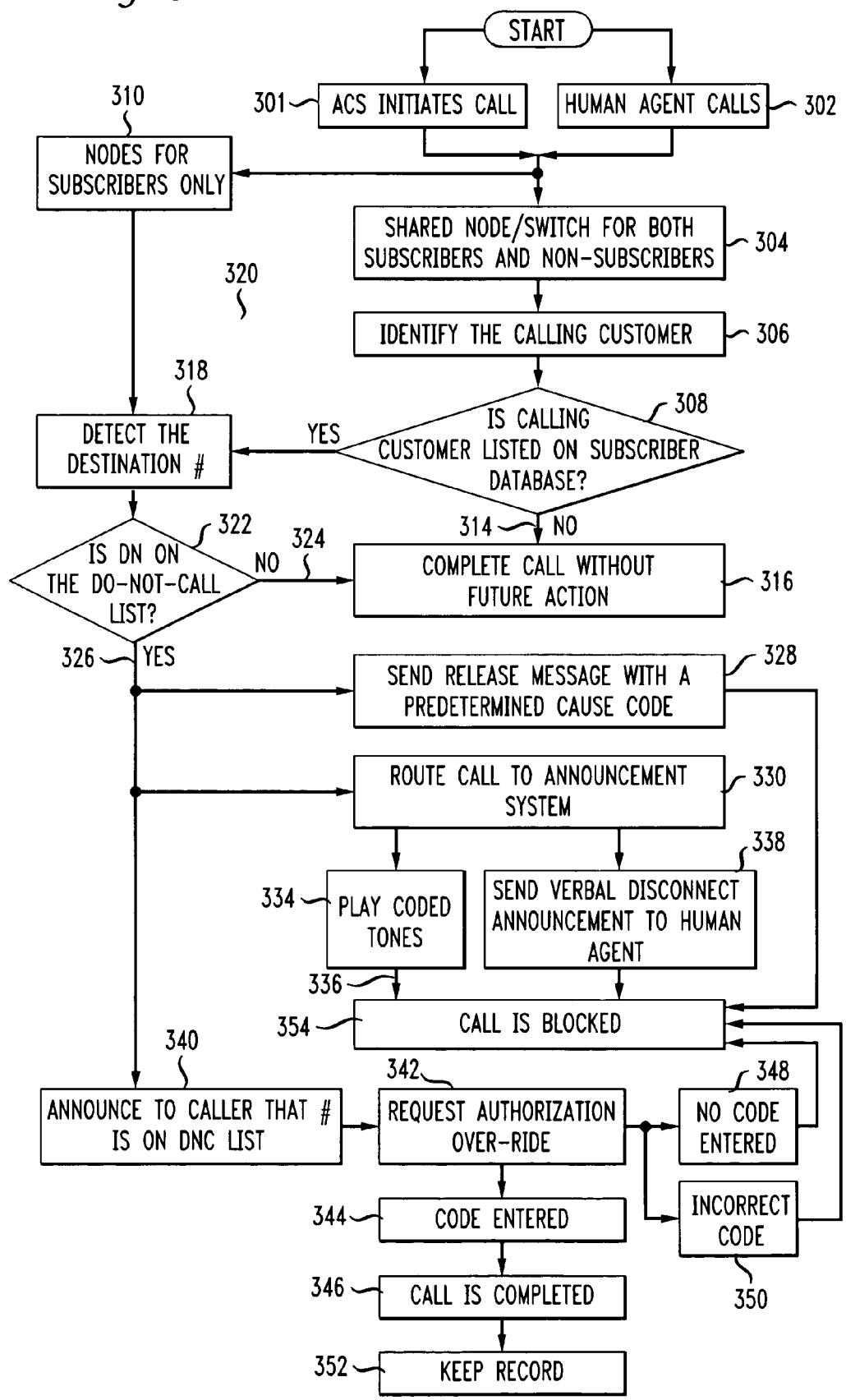
FIG. 3 is a flowchart showing exemplary processing of telecommunication messages in an embodiment of the invention.

Another aspect of this invention is administration. In this implementation there is a Service Management System (SMS) 208 which receives information from the Do Not Call List System 209 and downloads it into the SCP Database 202. This is done periodically to insure currency of the data so as to meet regulatory requirements. Various methods are known and available to do this. For example Local Number Portability databases, which each carrier utilizes to route calls to ported numbers, are updated in a similar manner A typical call flow chart in FIG. 3 shows an exemplary operation of the embodiment of FIG. 2. An ACS initiates a call (step 301) or a telemarketing agent makes a call (302) to a number (DN) of the phone of a telemarketing contact. The call may be transmitted to a shared node/switch such as Originating Switch 200 that processes calls from both subscribers and non-subscribers (step 304). In the case of an ACS directly connected to the Originating Switch this DN call is transmitted to the switch within a Q.931 Setup message for the ISDN PRI case, or it is transmitted via inband signaling. The calling customer is identified (step 306). There is also an ANI identifying the calling customer associated with this PRI. In the case of switched access via a Local Exchange Carrier (LEC), the LEC transmits the ANI and DN in an SS7 ISUP Initial Address Message (IAM).

The originating switch sends a query (step 308) to the Subscriber Database (SD), which can be either internal to the switch, or in a separate network element, to determine if the subscriber's ANI is subscribed to this do not call list service. It is also possible to skip this step where all calls are from subscribers (step 310) or all subscriber calls are clearly identified. For example, such identification could be made by marking the incoming trunk group so that all such calls receive this service, or including a signaling parameter in the Setup message which activates the service feature or alternatively leaves a default service feature unchanged.

If the subscriber is not subscribed to this service, the SD database will indicate so (314) and call processing will proceed as normal with other feature processing, (step 316) etc. accordance with normal message processing. If the subscriber is listed in the Subscriber Database or has activated the do not call list service, a destination number DN is detected (step 318) from the message.

The originating switch will then send a query (step 322) to the SCP to determine if the DN is on the do not call list. If the DN is not on the list, the response from the SCP will indicate so (324), and the call to the DN via the terminating switch, LEC, etc., will proceed as normal (step 316). If the DN is on the list, the response from the SCP will indicate this (326) to the originating switch. At this point several actions are possible.

In certain embodiments, the originating switch may send a Release message (step 328) with a predetermined cause code such as "Vacant Code" towards the subscriber which will cause the subscriber or his/her equipment to immediately terminate the call (step 328) by cancellation. It should be noted that the invention embodiments are not limited to any specific type of code identifier or cause code, so long as it causes the originating equipment to disconnect or otherwise prevents the call from being completed.

In some embodiments, under instruction from the SCP, the originating switch routes the call (step 330) to the internal or external AS and instructs the AS to play (step 334) a Vacant Code announcement. This announcement consists of three tones that cause (step 336) an ACS to disconnect the call. This announcement may also be a verbal announcement (step 338) to the human agent instructing them to disconnect the call. Alternatively, an announcement that specifically advises that the DN is on the do not call list could be provided. The exact announcement is not critical to the invention as long as the automated equipment or human agent is instructed to disconnect the call.

In some exemplary embodiments, under instruction from the SCP, the originating switch routes the call to an AS with tone collection capabilities. The caller hears an announcement that states that the call is being blocked because the dialed number is on the do-not-call list (step 340), and requests entry (step 342) of an authorization over-ride code in accordance with a pre-determined exemption to complete the call. The user then enters an authorization code (step 344) using a touchtone keypad, which is collected by the AS, and then forwarded by the switch to the SCP. If the authorization code is correct, the SCP instructs the switch (step 346) to complete the call, or if not the caller could be given a second chance to enter a correct code. If no authorization code is entered (step 348), or if an incorrect authorization code is entered (step 350), then the call can be terminated or blocked (step 354). Optionally, the authorization code can be included in the billing record (step 352) generated by the switch for the call. This might be useful in case a dispute arises regarding whether the telemarketer properly utilized the do not call list. For example, an authorization code could be assigned to a charity which is exempt from do not call list restrictions. Now the telemarketer has a record that proves that the particular call was made on behalf of that charity and not some non-exempt entity.

The solution proposed here is to provide a network service that will activate the screening requested by the subscriber and block (step 354) calls or messages directed to a destination listed on a DNC List. In other words, various basic embodiments enable a network to simulate a Vacant Code condition when the subscriber dials a number on the Do Not Call list. This requires no development on customer equipment or training of personnel, since handling Vacant Code is an existing function. For ISDN based automated equipment, the network will transmit the appropriate Cause Code to cause the equipment to terminate the call and try another number. For inband signaled equipment, an inband Vacant Code announcement, which includes a specific set of three tones, will accomplish the same thing. Of course, the audible announcement also serves as an indication to human callers that they should disconnect the call.

Beyond the basic solution, enhancements are possible. For example, with some development of premises equipment, a new ISDN cause code or announcement can be implemented which specifically distinguishes these calls from true Vacant Codes if this is desired. It would also be possible to provide an "override" function where the caller can enter an authorization code which allows the call to complete even if the number is on the Do Not Call list. This can also be implemented in ISDN by including a special signaling parameter to accomplish the same thing; this would be useful for a telemarketer that was serving as an agent for an organization that is exempt from Do Not Call rules, such as a charity or phone company. Also, if a telemarketer is calling an established customer, they are also exempt from the Do Not Call rules for that call, and could include the override parameter in the signaling message.

It will be understood by those skilled in the art that many other enhancements and variations to the above call flow can be envisioned that are within the scope of this invention.

Figure 4:
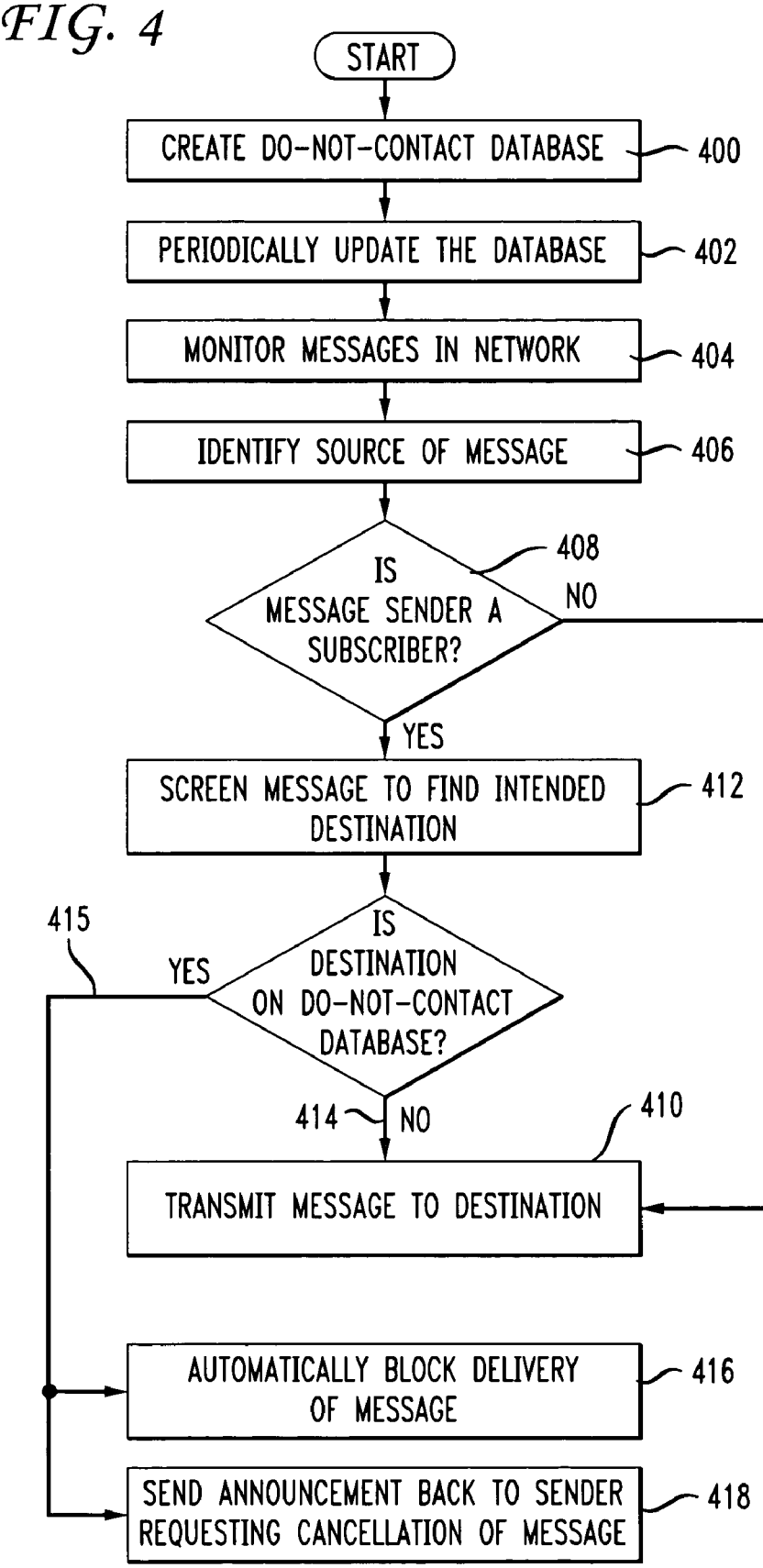
FIG. 4 is a flowchart showing additional processing of telecommunication messages in various embodiments of the invention.

As shown in FIG. 4, a network service provider creates and maintains a do-not-contact database (step 400), and periodically updates (step 402) the database in accordance with government regulations or subscriber requests. A service is provided somewhere on a network (on customer premises or remote from customer premises) to monitor messages (step 404) passing through special processing dedicated nodes or shared nodes in the network. A source or originating identification for the message is detected and identified (step 406), and that identification (or other encoding or marking on the message) is used to determine if the message sender is a subscriber (step 408) to the service. If the message is from a non-subscriber, no further screening is necessary and the non-subscriber's message is transmitted to its addressed destination (step 410).

However, if the message is from a subscriber, all such subscriber's messages are screened to detect an intended destination (step 412). If the destination is not listed on the do-not-contact database (414), then it is transmitted to its addressed destination (step 410). For destinations found on the do-not-contact database (415), delivery of the message is automatically blocked (step 416) or else an announcement is sent back to a sender (step 418) requesting cancellation of the message.

The creation of a "do-not-contact" database may be based on different customized criteria. In some instances it may not be legally required to refrain from sending an unsolicited message, but instead certain destinations may be undesirable because of the nature of the message and the intended target audience. The category of preferred recipients may be defined by various demographic characteristics including but not limited to geographic location, age, education, political party, socio-economic status, and career. It is the periodic and ongoing changes of a list of undesirable message destinations that creates the need for a real-time service for monitoring and selectively blocking delivery of network messages in accordance with instructions from subscribing entities.

Figure 5:
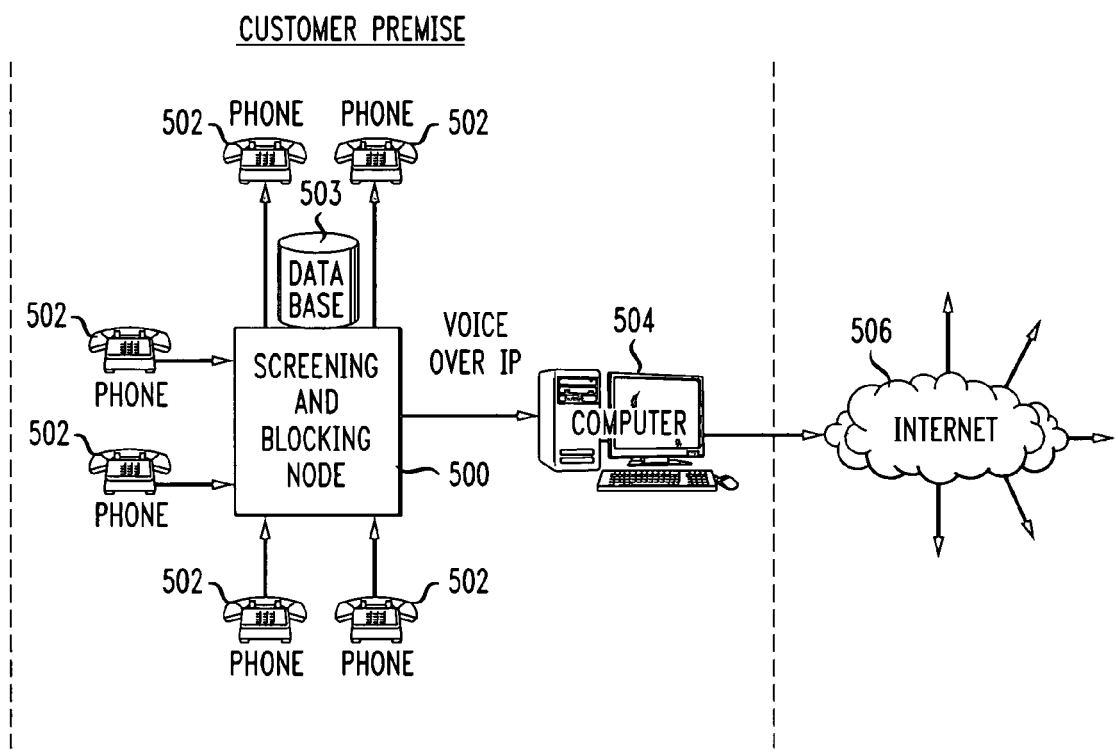
FIG. 5 is a schematic diagram showing an exemplary implementation of the invention in a Voice over IP embodiment.

Referring to FIG. 5, an exemplary embodiment of the invention implemented in a Voice over Internet Protocol (VoIP) network is shown. A screening and blocking node 500 may be located on customer premises or within the service provider network for handling calls from multiple phones 502 in order to screen destination addresses and block delivery of telecommunication sent to addresses listed on a do-not-call database 503. Only approved calls are then transmitted through a server such as computer 504 for delivery via the Internet 506.

In summary it will be understood from the foregoing description that the unique services of the invention allows subscribers to share a periodically updated database of "do-not-contact" destinations as a common link to a communication node that handles messages transmitted from many subscribing and non-subscribing parties. All appropriate messages are first identified as coming from a subscribing party, and such pre-selected messages are then screened to determine whether an intended destination for the pre-selected message is listed on the "do-not-contact" database. If the intended destination matches a "do-not-contact" database destination, then remedial action is taken to prevent delivery of the message. All other messages are allowed to proceed without any interruption to their destination.

Where the features of the invention are implemented in a telephony network, it is possible to recognize a subscriber's message based on its originating caller number as well as on other information such as ANI billing number identification, trunk line identity, inband coded information or marks, or signal/control information on a non-message channel.

From a customer perspective, subscribers are relieved from the cost and other burdens of having their own subscription to a periodically updated Do Not Call (DNC) List, administering it, modifying equipment, etc., as well as the risk of making a mistake and being fined, penalized, or suffering other consequences because of an out-of-date list. This might be particularly important to smaller customers. From a revenue and efficiency perspective, both customers and network operators will benefit because more completed calls will occur in a given period of time.

The foregoing Detailed Description is to be understood as being in every respect illustrative and exemplary, but not restrictive, and the scope of the invention disclosed herein is not to be determined from the detailed Description, but rather from the claims as interpreted according to the full breadth permitted by the patent laws. It is to be understood that the embodiments shown and described herein are not only illustrative of the principles of the present invention and that various modifications may be implemented by those skilled in the art without departing from the scope and spirit of the invention.

What is claimed is:

1. A system for providing an updated database service to be available to third party subscribers, including maintaining a listing of undesirable destinations, said system comprising:
   a directory identifying the third party subscribers to the updated database service;
   a database for listing the undesirable destinations, said database accessible to the third party subscribers; and
   a switch device connected to said database to disable any particular telecommunication initiated by a communication sender on behalf of a third party subscriber that is directed to an undesirable destination listed in the database, wherein said switch device adds a code identifier to the telecommunication, said code identifier preventing completion of a telecommunication to an undesirable destination listed in the database.

2. The system of claim 1 wherein said code identifier automatically prevents completion of a telecommunication to an undesirable destination without any intervention or action by the communication sender.

3. The system of claim 1 wherein the communication sender comprises automated equipment for initiating the telecommunication, and said switch device causes a disabling message to be routed back to said automated equipment in order to prevent completion of the telecommunication.

4. The system of claim 1 wherein the communication sender is a human agent for initiating the telecommunication, and said switch device causes an announcement message to be routed back to said human agent in order to prevent completion of the telecommunication.

5. The system of claim 1 further comprising:
a communications network for transmitting the sales, promotional, survey or informational telecommunications, said communications network comprising one or more of the following: wireless, cable, Internet, satellite, radio, television, power lines, LAN, WAN, PSTN.

6. The system of claim 1 further comprising:
a communications network for transmitting telecommunications comprising one or more of the following types of messages: voice, text, alphanumeric, fax, data, image, audio, video.

7. The system of claim 1 further comprising:
database management means in communication with said database for downloading periodic revisions to be incorporated into said database.

8. A system for providing an updated database service to be available to third party subscribers, including maintaining a listing of undesirable destinations, said system comprising:
a directory identifying the third party subscribers to the updated database service;
a database for listing the undesirable destinations, said database accessible to the third party subscribers; and
a switch device connected to said database to disable any particular telecommunication initiated by a communication sender on behalf of a third party subscriber that is directed to an undesirable destination listed in the database,
wherein said database comprises a do-not-contact list.

9. A method of blocking certain telecommunications sent via a communication network by telemarketers that subscribe to a "do-not-contact" database service, said method comprising:
maintaining a directory of the subscribing telemarketers;
identifying at a network node selected telecommunication messages transmitted from said subscribing telemarketers;
screening all such selected telecommunication messages to compare an intended destination with a database of "do-not-contact" destinations; and
blocking screened messages from being delivered to an intended destination that is listed on said database.

10. The method of claim 9 wherein said directory comprises a list of originating message addresses for subscribing telemarketers, and said identifying recognizes said originating message addresses.

11. The method of claim 9 which further comprises periodically updating the database of "do-not-contact" destinations.

12. The method of claim 11 wherein said database comprises listing "do-not-contact" destinations in accordance with categories determined by demographic characteristics.

13. The method of claim 9 which further comprises overriding said blocking function based on predetermined exemptions.

14. The method of claim 13 wherein said overriding comprises entering an authorization code, and generating a record confirming the exemption.

15. A method of preventing delivery of certain telecommunications in a communication network comprising:
initiating a telecommunication message on behalf of a sender for transmission via the communication network to a proposed destination address;
screening the telecommunication message at a network node to compare the proposed destination address with a periodically updated database of undesirable destination addresses;
taking remedial action to prevent delivery of a selected telecommunication message having the proposed destination address listed on said periodically updated database;
providing a directory listing of subscribing message senders;
identifying particular telecommunication messages transmitted from said subscribing message senders;
performing said screening and said remedial action only with respect to said particular telecommunication messages from said subscribing message senders; and
maintaining a common periodically updated database of "do-not-contact" destination addresses, said common updated database accessible to said subscribing message senders.

16. The method of claim 15 wherein said initiating comprises activating automated equipment for initiating the telecommunication message, and said remedial action comprises automatically blocking delivery of said selected telecommunication message.

17. The method of claim 15 wherein said initiating comprises using a human agent for initiating the telecommunication message, and said remedial action comprises automatically blocking delivery of said selected telecommunication message.

18. The method of claim 15 wherein said initiating comprises using a human agent for initiating the telecommunication message, and said remedial action comprises giving an instruction to said human agent to terminate the transmission.

19. The method of claim 15 wherein said remedial action comprises an audible instruction to said human agent.

20. The method of claim 15 wherein said audible instruction is a verbal instruction or a coded signal.

21. A system for providing an updated "do-not-contact" database service available to third party subscribers sending telecommunications via a communications network, comprising:
a periodically updated database for listing the "do-not-contact" destinations;
a node for receiving and forwarding selected telecommunications from a third party subscriber along the communications network to a proposed destination address, said node having access to said database for comparing the proposed destination address with the "do-not-contact" destinations in said database; and
blocking means for preventing delivery of said selected telecommunications to any "do-not-contact" destinations in said database.

22. The system of claim 21 wherein said database is incorporated as part of the communication premises of a third party subscriber or its message originator.

23. The system of claim 21 wherein said database is incorporated as part of the communications network separate and apart from the communication premises of a third party subscriber or its message originator.

24. The system of claim 23 wherein said database is accessible to other third party subscribers.

25. The system of claim 21 wherein said node is incorporated as part of the communication premises of a third party subscriber or its agent.

26. The system of claim 21 wherein said node is incorporated as part of the communications network separate and apart from the communication premises of a third party subscriber or its message originator.

\* \* \* \* \*